(12) United States Patent
Franczyk et al.

(10) Patent No.: US 8,608,124 B2
(45) Date of Patent: Dec. 17, 2013

(54) BAKED GOODS DECORATING AND DISPLAY ASSEMBLY

(75) Inventors: Catherine Franczyk, Woodridge, IL (US); Stephanie Goode, Woodridge, IL (US); Roy Melling, Escondido, CA (US); Hugh Melling, Harbor Springs, MI (US); Kristian Buschmann, Woodridge, IL (US)

(73) Assignee: Wilton Industries, Inc., Woodridge, IL (US)

( * ) Notice: Subject to any disclaimer, the term of this patent is extended or adjusted under 35 U.S.C. 154(b) by 169 days.

(21) Appl. No.: 13/213,902

(22) Filed: Aug. 19, 2011

(65) Prior Publication Data

US 2012/0043447 A1    Feb. 23, 2012

Related U.S. Application Data

(60) Provisional application No. 61/375,419, filed on Aug. 20, 2010.

(51) Int. Cl.
*A47B 91/00* (2006.01)

(52) U.S. Cl.
USPC ......... 248/349.1; 248/397; 248/398; 118/302

(58) Field of Classification Search
USPC ........ 248/371, 372.1, 393–398, 183.1, 183.2, 248/183.4, 278.1, 919, 921–923; 118/13, 118/18, 502; 361/679.06–679.07; 269/54.5; D7/558, 610

See application file for complete search history.

(56) References Cited

U.S. PATENT DOCUMENTS

| | | | | | |
|---|---|---|---|---|---|
| 1,468,247 | A | * | 9/1923 | Patten | 108/21 |
| 2,209,858 | A | * | 7/1940 | Steiert | 74/112 |
| 4,074,656 | A | * | 2/1978 | Haapala | 118/502 |
| 4,436,042 | A | * | 3/1984 | Hanyu et al. | 112/217.1 |
| 5,878,671 | A | * | 3/1999 | Kehl | 108/22 |
| 2008/0251675 | A1 | * | 10/2008 | Amato et al. | 248/349.1 |

* cited by examiner

*Primary Examiner* — Gwendolyn Baxter
(74) *Attorney, Agent, or Firm* — McDermott Will & Emery LLP

(57) ABSTRACT

A rotating and tilting cake stand comprising a rotation assembly, a base assembly, and a platter. The rotation assembly has a fixed portion and a rotatable portion. A rotation control mechanism controlling the rotation of the rotatable portion relative to the fixed portion. The base assembly has a base portion and a support portion that connects to the rotation assembly. Within the base assembly is a tilt-support arm that is connected to the rotation assembly and support portion with a pin that allows the tilt-support arm to pivot, causing the platter to tilt. In the base portion, a lock engages the tilt-support arm to either inhibit or allow the tilt-support arm to move freely. The lock is manipulated by a button in the base portion that is connected to a rotational pivot that is connected to the lock.

8 Claims, 6 Drawing Sheets

BAKED GOODS DECORATING AND DISPLAY ASSEMBLY

CROSS-REFERENCE TO RELATED APPLICATIONS

This application claims priority to U.S. Provisional Patent Application Ser. No. 61/375,419 filed Aug. 20, 2010 which is incorporated herein by reference in its entirety.

TECHNICAL FIELD

The present disclosure is related to a baked good display and decorating stands, and more particular to a cake stand.

BACKGROUND OF THE INVENTION

While decorating a cake, it is often difficult to comfortably and conveniently decorate the whole cake as one must spin the cake in order to decorate all regions of the cake. Initially, for display and convenience, the cake decorator would place the cake on a stand in order to raise the cake off of the work surface. Over the years, features were added to cake stands such as providing a rotating mechanism in the platter. This allowed the decorator to more easily decorate the whole cake while staying in a fixed position. Additionally, cake stands have been made that allow the platter to tilt to various angles in order to make the cake decorating more convenient. Some cakes stands have been produced that combine both the tilting and rotating function. However, these designs have been difficult to operate and have limited tilting positions.

The present invention is provided as a cake stand that can both rotate and tilt in a wide variety of positions. A full discussion of the features and advantages of the present invention is deferred to the following detailed description, which proceeds with reference to the accompanying drawings.

SUMMARY OF THE INVENTION

According to one embodiment, a cake stand comprises a platter, a platter support, and a base. The platter has an overmold attached to its top surface. The platter support assembly has a fixed portion and a rotatable portion that rotates in relation to the fixed portion. The platter attaches to the rotatable portion of the platter support assembly. The fixed portion has a rotational control mechanism with two positions. The first position engages an orientation ring inside the rotatable portion. By pulling a lever connected to the rotational control mechanism, the user may inhibit the rotatable portion from moving; by pushing the lever in, the rotatable portion can move freely. The orientation ring may have a plurality of teeth with which the rotational control mechanism in the first position engages. The fixed portion also has a race that houses ball bearings. The fixed portion and rotatable portion only touch at these ball bearings. The fixed portion is attached to the base.

According to another embodiment, a cake stand comprises a platter, a platter support assembly, and a tilting assembly. The platter has an overmold attached to its top surface. It is attached to the platter support assembly. The tilting assembly has a base portion and a support portion that extends up and attaches to the platter support assembly. Within the tilting assembly, a tilt-support arm is connected to the platter support assembly and support portion of the tilting assembly by a pin. The tilt-support arm pivots around this pin, causing the platter assembly to tilt around the longitudinal axis of the pin. The tilt-support arm is acted upon by a tilt-orientation lock in the base portion that locks the tilt-support arm in place. The tilt-orientation lock has two positions. The first position engages the tilt-support arm and inhibits it from moving. The second position disengages the tilt-support arm and allows it to swing freely. In the base portion, there is a release mechanism. The release mechanism consists of a button on the outside of the tilting assembly that connects to a rotating pivot, which is connected to the tilt-orientation lock. By pressing the button, the tilt-orientation lock moves into the second position and allows the tilt-support arm to move freely. A biasing member acts on the button to push it back up after it has been released. Another biasing member between the rotating pivot and tilt-orientation lock bias the mechanism so that the tilt-orientation lock moves back to its first position, thus locking the tilt-support arm in place after the button is depressed. The tilt-orientation lock can have teeth that engage the tilt-orientation arm. The biasing members can both be springs.

According to a further embodiment, a cake stand comprises a platter, a platter support assembly, and a tilting assembly. The platter has an overmold attached to its top surface. The platter support assembly has a fixed portion and a rotatable portion that rotates in relation to the fixed portion. The platter attaches to the rotatable portion of the platter support assembly. The fixed portion has a rotational control mechanism that interacts with an orientation ring inside the rotatable portion. By pulling a lever connected to the rotational control mechanism, the user may inhibit the rotatable portion from moving; by pushing the lever in, the rotatable portion can move freely. The fixed portion also has a race that houses ball bearings. The fixed portion and rotatable portion only touch at these ball bearings. The tilting assembly has a base portion and a support portion that extends up to the platter support assembly. Within the tilting assembly, a tilt-support arm is connected to the platter support assembly and support portion of the tilting assembly by a pin. The tilt-support arm pivots around this pin, causing the platter support assembly to tilt. The tilt-support arm is acted upon by a tilt-orientation lock in the base portion that locks the tilt-support arm in place. The tilt-orientation lock has two positions. The first position engages the tilt-support arm and inhibits it from moving. The second position disengages the tilt-support arm and allows it to swing freely. In the base portion, there is a release mechanism. The release mechanism consists of a button on the outside of the tilting assembly that connects to a rotating pivot, which is connected to the tilt-orientation lock. By pressing the button, the tilt-orientation lock moves into the second position and allows the tilt-support arm to move freely. A biasing member acts on the button to push it back up after it has been released. Another biasing member between the rotating pivot and tilt-orientation lock bias the mechanism so that the tilt-orientation lock moves back to its first position, thus locking the tilt-support arm in place after the button is depressed. The tilt-orientation lock can have teeth that engage the tilt-orientation arm. The biasing members can both be springs.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
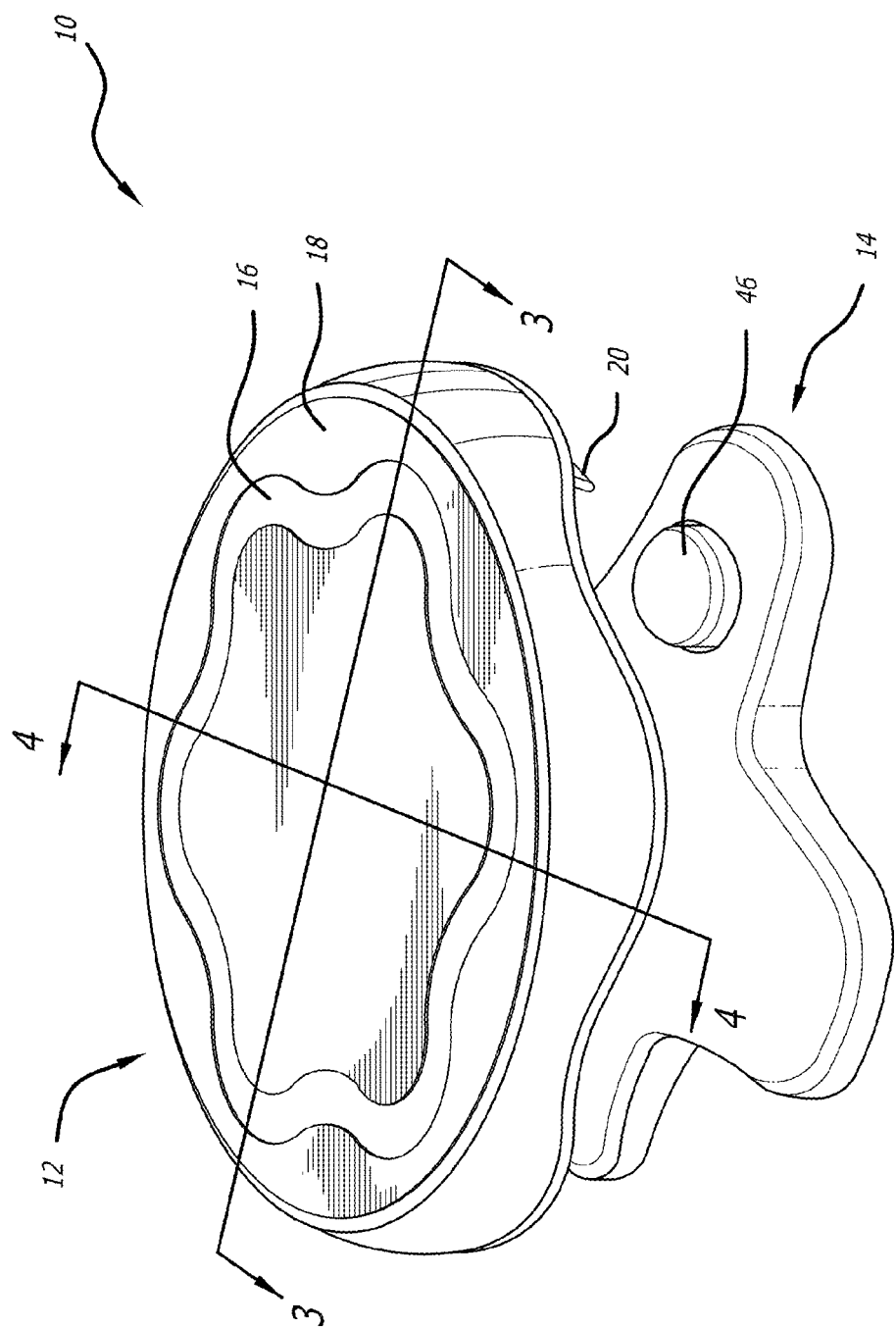
FIG. 1 is a perspective view of a cake stand.
Figure 2:
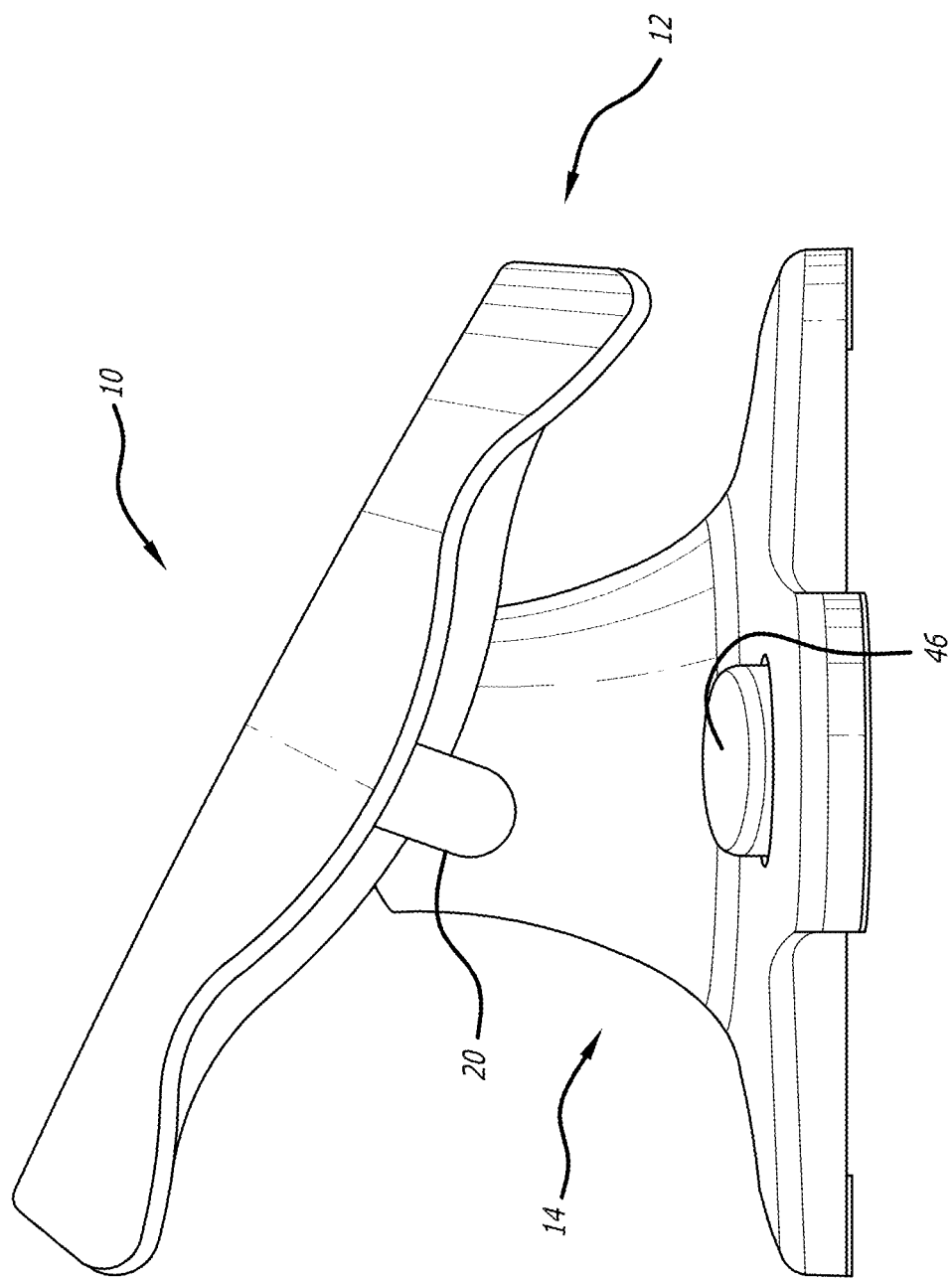
FIG. 2 is a side view of the cake stand of FIG. 1 with the platter in a tilted position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

According to one embodiment of the present invention, as shown in FIGS. 1-6, a rotating and tilting cake stand assembly 10 is provided. The cake stand assembly 10 comprises a platter support assembly 12 and a base assembly 14.

The platter support assembly 12 comprises a generally flat platter 16 adapted to support a cake or other baked good being decorated or displayed by a user. An overmold 18 may be applied to the generally flat platter 16 to enhance a frictional force between a baked good and the generally flat platter 16. It is understood that the overmold 18 can be molded onto the generally flat platter 16, or may be secured to the generally platter 16 by fasteners, adhesives, or any other suitable fastening methods.

Figure 3:
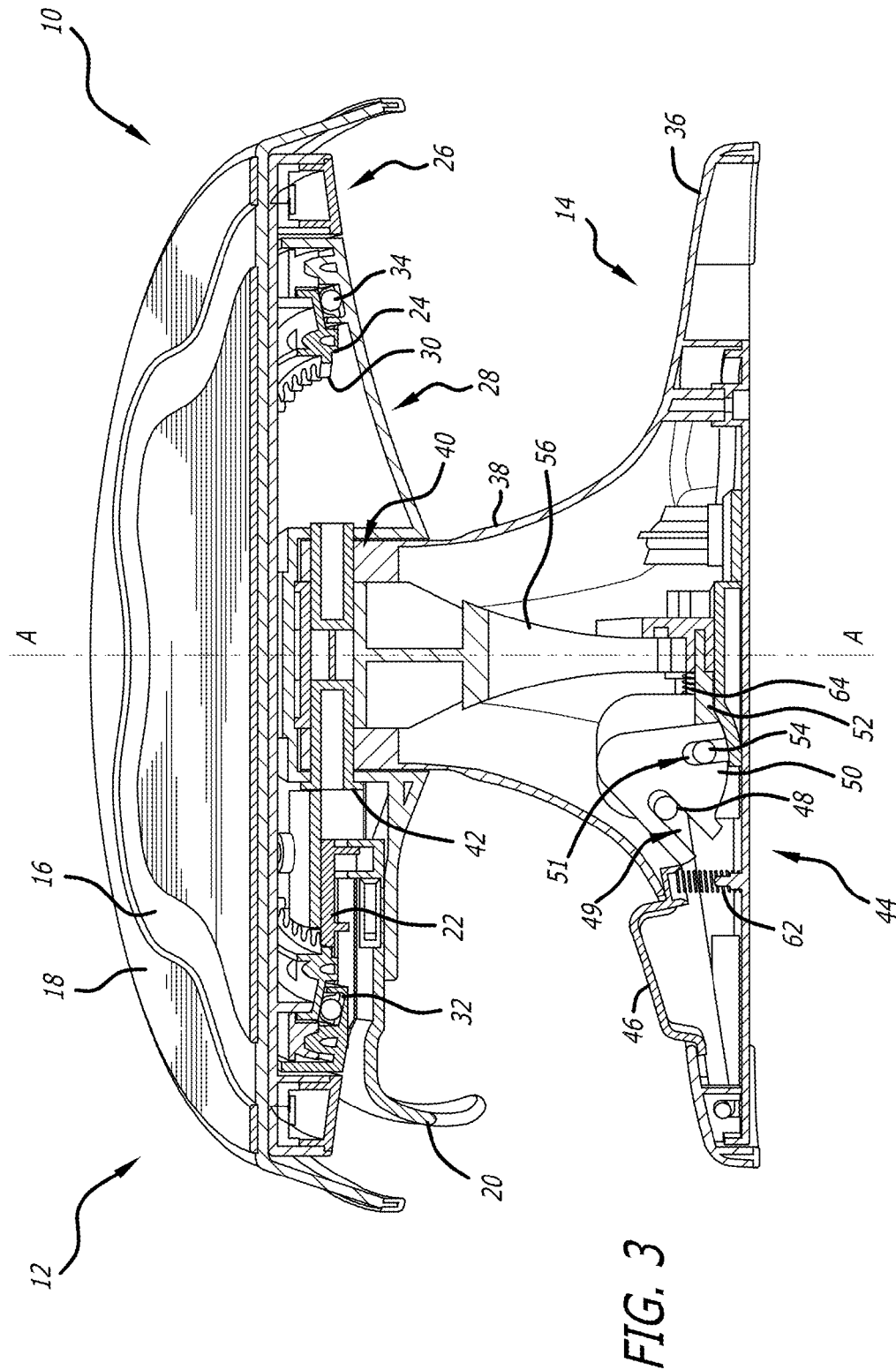
FIG. 3 is a cross-section of the cake stand of FIG. 1 taken along line 3-3.
Figure 5:
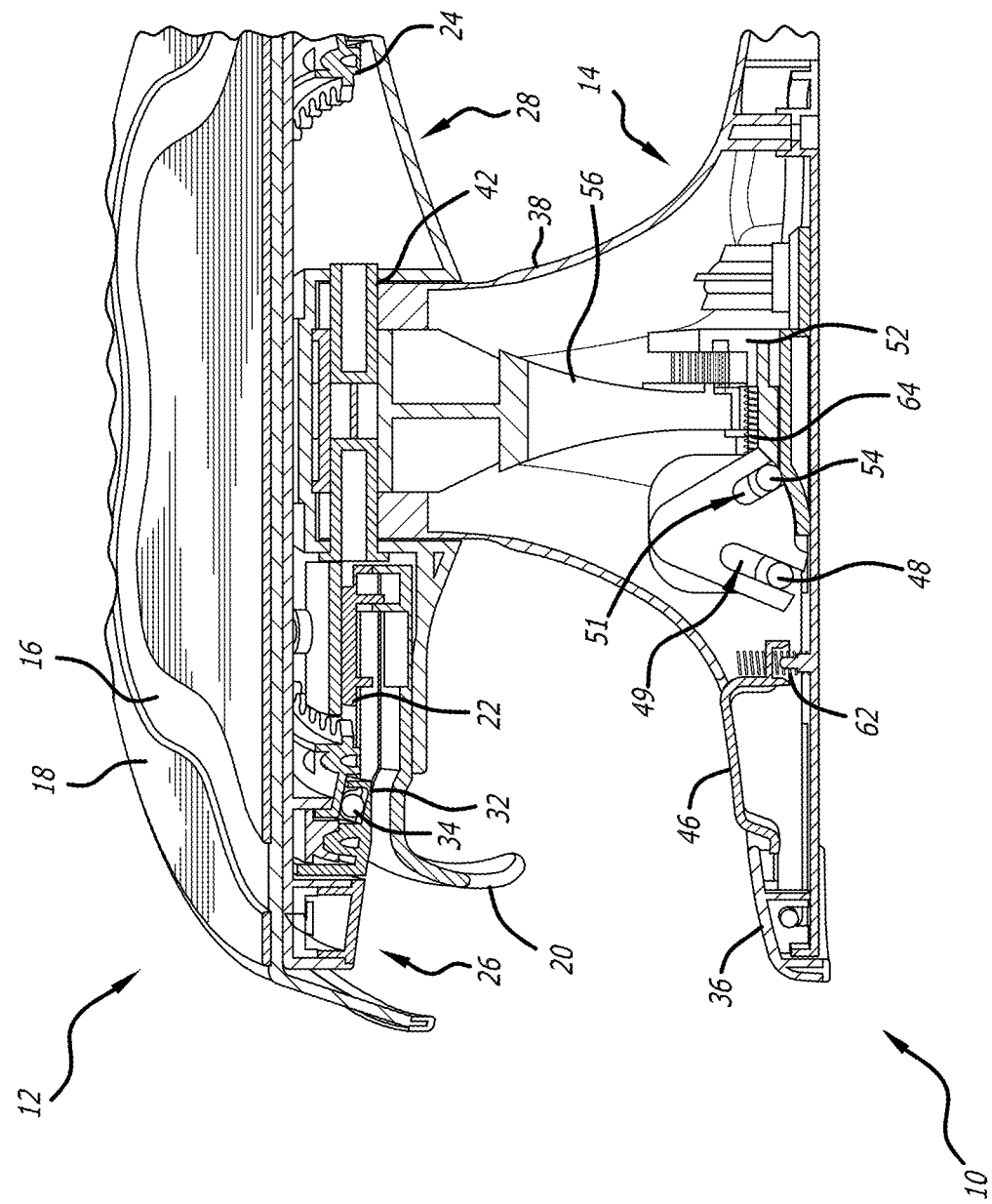
FIG. 5 is a cross-section of the cake stand of FIG. 1 taken along line 3-3 with a tilt release button in a depressed position.

The platter support assembly 12 additionally comprises a rotation control lever 20. The rotation control lever 20 is movable between a first position (FIG. 3) and a second position (FIG. 5). A rotational control mechanism 22 is connected to the rotation control lever 20. The movement of the rotation control lever 20 also moves the rotational control mechanism 22. As shown in FIG. 3, the rotational control mechanism 22 engages an orientation ring 24 when the rotation control lever 20 is in the first position. As shown in FIG. 5, when the rotation control lever 20 is in the second position, the rotational control mechanism 22 is disengaged from the orientation ring 24.

As best shown in FIG. 3, the platter support assembly 12 has a rotatable portion 26 and a fixed portion 28. The rotatable portion 26 rotates about an axis A-A generally centered on the cake stand assembly 10 to move the rotatable portion 26 relative to the fixed portion 28. The generally flat platter 16 is releasably coupled to the rotatable portion 26 and is removable from the rotatable portion 26. It is understood that the generally flat platter 16 may attach to the rotatable portion 26 by snaps, fasteners, or other suitable mechanisms to allow the generally flat platter 16 to be removed from the rotatable portion 26 when desired.

The rotatable portion 26 comprises the orientation ring 24. As shown in FIGS. 3 and 5, the orientation ring 24 has a plurality of teeth 30. The fixed portion 28 of the cake stand assembly 10 comprises the rotational control lever 20 and the rotational control mechanism 22 that are movable between a first and second position. In the first position (FIG. 3), the rotational control mechanism 22 engages at least one of the teeth 30 of the orientation ring 24 to inhibit motion of the rotatable portion 26 relative to the fixed portion 28. When the rotational control lever 20 and the rotational control mechanism 22 are moved to the second position, the rotational control mechanism 22 disengages from the plurality of teeth 30 of the orientation ring 24, allowing the rotatable portion 26 to move rotate about axis A-A relative to the fixed portion 28. The rotatable portion 26 can rotate 360 degrees about the axis A-A when the rotational control mechanism 22 is in the second position.

It is additionally contemplated that the fixed portion 28 has bearing race housing 32. The bearing race housing 32 retains a plurality of ball bearings 34 that rest upon the fixed portion 28 and support the rotatable portion 26. It is contemplated that the only points of contact between the fixed portion 28 and the rotatable portion 26 occur at the ball bearings 34, which allows the rotatable portion 26 to freely rotate in relation to the fixed portion 28. The ball bearings 34 may support a portion of the orientation ring 24.

The base assembly 14 supports the platter support assembly 12. The base assembly 14 comprises a base portion 36 and a support portion 38 that extends upwardly from the base portion 36. The support portion 38 has an opening 40 formed through the support portion 38 to receive a pin 42 to connect the platter support assembly 12 to the base assembly 14. The pin 42 passes through the fixed portion 28 of the platter support assembly 12. The platter support assembly 12 is tiltable relative to the base assembly 14 about the pin 42.

The tilting movement of the platter support assembly 12 is controlled by a tilt control system 44. The tilt control system 44 has a tilt release button 46. The tilt release button 46 passes through an opening in the base portion 36 of the base assembly 14. The tilt release button 46 has a pin 48 that contacts a tilt control cam 50. The pin 48 moves within a slot 49 formed in the tilt control cam 50. The tilt control cam 50 is moveable between a first position (FIG. 3) when the tilt release button 46 is not depressed, and a second position (FIG. 5) with the tilt release button 46 in a depressed position. The rotation of the tilt control cam 50 causes a tilt arm retaining member 52 to slide from a first position (FIG. 3) to a second position (FIG. 5). The tilt arm retaining member 52 has a pin 54 disposed within a second slot 51 of the tilt control cam 50.

The tilt control system 44 additionally comprises a tilt-support arm 56. The tilt-support arm 56 has a plurality of teeth 58 that interact with a plurality of teeth 60 formed on the tilt arm retaining member 52. The teeth 60 of the tilt arm retaining member 52 disengage the teeth 58 of the tilt-support arm 56 with the tilt arm retaining member 52 in the second position. When the tilt arm retaining member 52 is disposed in the second position, the tilt-support arm 56 may pivot about the pin 42, allowing the platter support assembly 12 to tilt relative to the base assembly 14, such as from a position shown in FIG. 4 to a position shown in FIG. 6.

Figure 4:
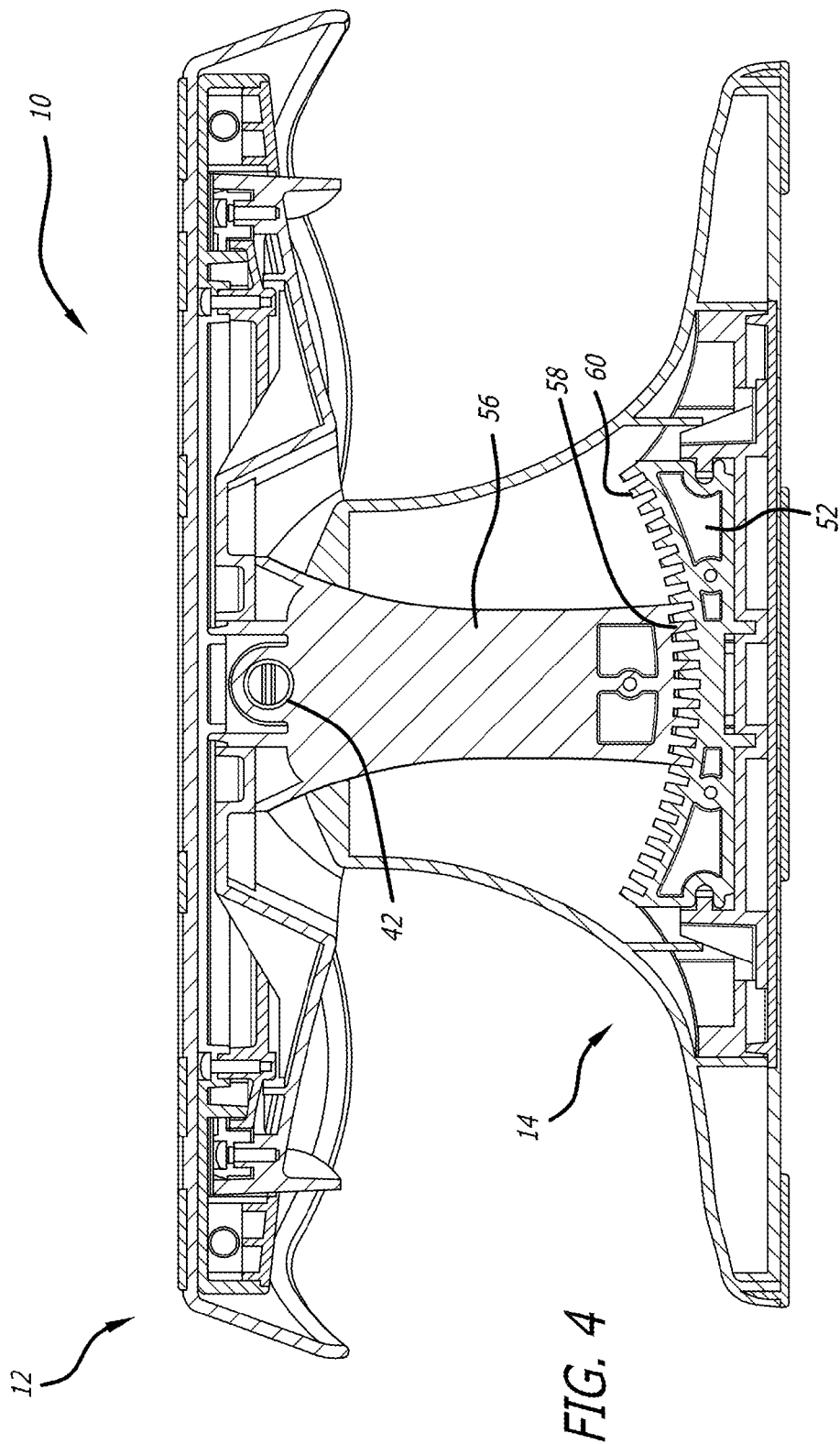
FIG. 4 is a cross-section of the cake stand of FIG. 1 taken along line 4-4.
Figure 6:
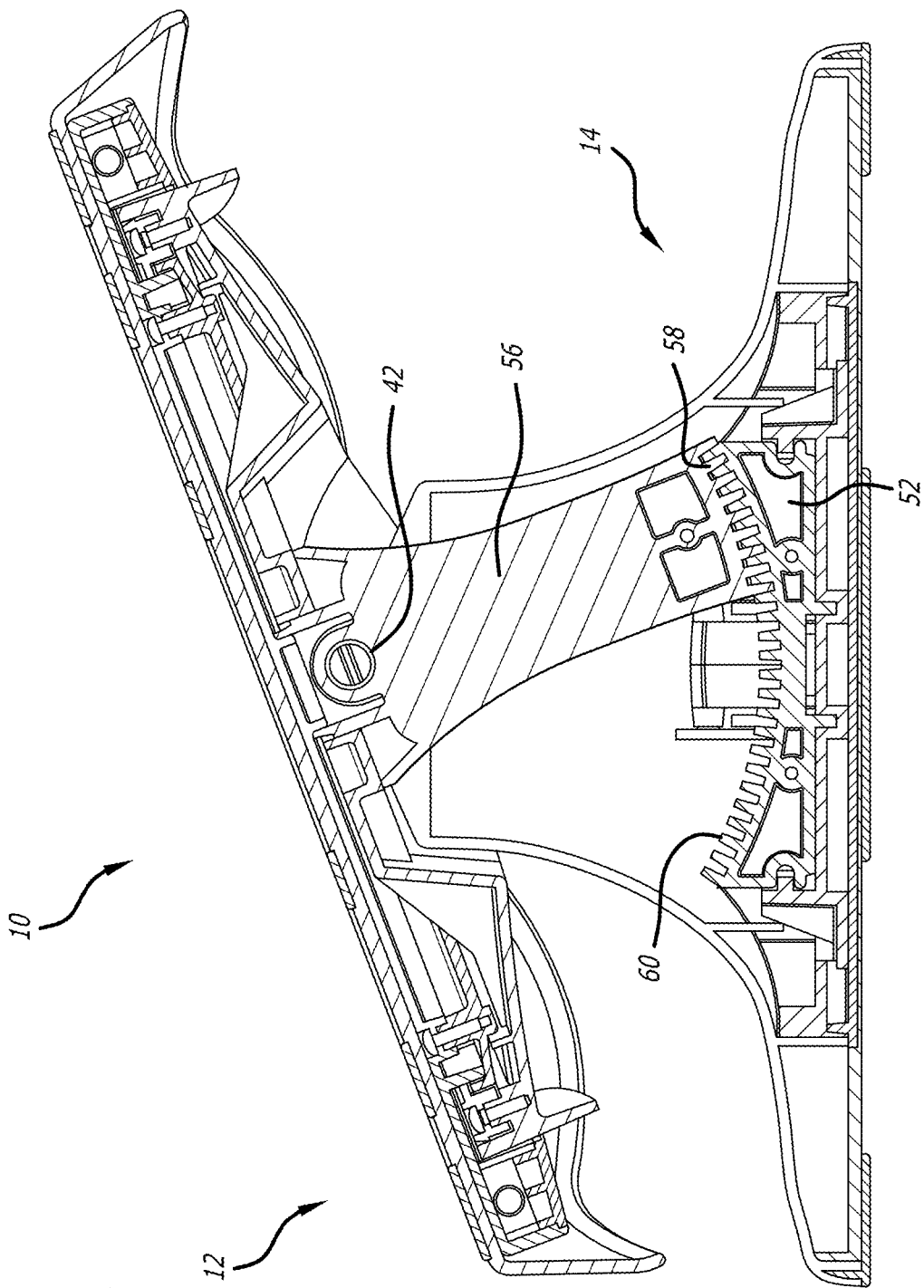
FIG. 6 is a cross-section of the cake stand of FIG. 1 taken along line 4-4 with the platter in a tilted position.

As shown in FIGS. 4 and 6, the teeth 60 formed on the tilt arm retaining member 52 are about 2⅔ degrees apart, generating nine distinct tilt positions for the platter support assembly 12 relative to the base assembly 14. However, it is contemplated that more or less tilt positions may be generated based on the size of the tilt arm retaining member 52 and the spacing of teeth 60 on the tilt arm retaining member 52 and the spacing of the teeth 58 on the tilt-support arm 56.

As shown in the illustrated embodiment, a first biasing member 62 is provided to bias the tilt release button 46 to a non-depressed position, as shown in FIG. 3. The first biasing member 62 is shown as a spring, but it is contemplated that other types of biasing members may be utilized, such as compressible foam, a gas strut, or the like.

Similarly, a second biasing member 64 is provided to bias the tilt arm retaining member 52 to the first position, as shown in FIG. 3, where the tilt arm retaining member 52 limits the movement of the tilt-support arm 56. The second biasing member 64 is shown as a spring, but it is contemplated that other types of biasing members may be utilized, such as compressible foam, a gas strut, or the like.

While specific embodiments have been illustrated and described, numerous modifications come to mind without significantly departing from the spirit of the invention, and the scope of protection is only limited by the scope of the accompanying claims.

What is claimed is:

1. A tilting cake stand assembly comprising:
   a platter having a generally flat support surface releasably coupled to a platter support assembly;
   a base assembly having a base portion and a support portion extending upwards from the base portion, the support portion connecting to the platter assembly;
   a tilt-support arm connected to the platter support assembly and the support portion of the base assembly by a pin, the tilt-support arm being able to pivot about a longitudinal axis of the pin, wherein the pivoting of the tilt-support arm pivots the platter support assembly about the longitudinal axis of the pin; and
   a tilt control system comprising:
      a tilt arm retaining member being movable between a first position and second position, the first position of the tilt arm retaining member engaging the tilt-support arm, limiting the movement of the tilt-support arm;
      a tilt control cam having a first position and a second position, wherein the second position of the tilt control cam moves the tilt arm retaining member to the second position; and
      a release button connected to the tilt control cam, the release button being movable between a first and second position, wherein the second position of the release button moves the tilt arm retaining member to the second position.

2. The tilting cake assembly of claim 1, further comprising a first biasing member acting on the release button and biasing the release button to the first position.

3. The tilting cake assembly of claim 2, further comprising a second biasing member biasing the tilt arm retaining member to the first position.

4. The tilting cake assembly of claim 2, wherein the first biasing member is a spring.

5. The tilting cake assembly of claim 3, wherein the second biasing member is a spring.

6. The tilting cake assembly of claim 1, further comprising a platter overmold connected to the top surface of the platter.

7. The tilting cake assembly of claim 1, wherein the tilt arm retaining member has a plurality of teeth.

8. The tilting cake assembly of claim 7, wherein the tilt-support arm engages at least one tooth of the tilt arm retaining member with the tilt arm retaining member in the first position.

* * * * *